US012786934B2

(12) United States Patent
Yao et al.

(10) Patent No.: US 12,786,934 B2
(45) Date of Patent: Nov. 3, 2026

(54) SENSING-BASED POSITIONING METHOD AND APPARATUS, AND COMMUNICATION DEVICE

(71) Applicant: VIVO MOBILE COMMUNICATION CO., LTD., Guangdong (CN)

(72) Inventors: Jian Yao, Guangdong (CN); Ye Si, Guangdong (CN); Xiang Pan, Guangdong (CN); Yannan Yuan, Guangdong (CN); Dajie Jiang, Guangdong (CN); Xiaobo Wu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 288 days.

(21) Appl. No.: 18/613,648

(22) Filed: Mar. 22, 2024

(65) Prior Publication Data

US 2024/0236924 A1 Jul. 11, 2024

Related U.S. Application Data

(63) Continuation of application No. PCT/CN2022/119275, filed on Sep. 16, 2022.

(30) Foreign Application Priority Data

Sep. 22, 2021 (CN) .......................... 202111109210.0

(51) Int. Cl.

*H04W 64/00* (2009.01)
*H04L 5/00* (2006.01)
*H04W 24/10* (2009.01)

(52) U.S. Cl.

CPC ........... *H04W 64/00* (2013.01); *H04L 5/0051* (2013.01); *H04W 24/10* (2013.01)

(58) Field of Classification Search

CPC ....... H04W 64/00; H04W 24/10; H04W 4/02; H04L 5/0051; H04L 5/0026; H04L 5/0048; H04L 5/0069; G01S 13/87; G01S 7/006

(Continued)

(56) References Cited

U.S. PATENT DOCUMENTS 11,588,538 B2 * 2/2023 Chen ...................... H04B 7/063
2021/0345316 A1 11/2021 Xu et al.

(Continued)

FOREIGN PATENT DOCUMENTS

CN 1508561 A 6/2004
CN 106341793 A 1/2017

(Continued)

OTHER PUBLICATIONS

Zte Sanechips, "Summary of AI 8.11.3 for RRC_INACTIVE positioning", 3GPP TSG-RAN WG2 Meeting #115-e, R2-2108826, Electronic, Aug. 9-27, 2021.

*Primary Examiner* — Hirdepal Singh

(57) ABSTRACT

This application discloses a sensing-based positioning method and apparatus, and a communication device. The method of embodiments of this application includes: receiving, by a first communication device, a positioning requirement; and in a case that the positioning requirement is a positioning requirement associated with a sensing service, sending the positioning requirement to a second communication device and sending a sensing requirement to a third communication device.

16 Claims, 5 Drawing Sheets

(58) Field of Classification Search
USPC ........................................................ 455/456.1
See application file for complete search history.

(56) References Cited

U.S. PATENT DOCUMENTS

| | | | | |
|---|---|---|---|---|
| 2023/0309066 | A1* | 9/2023 | Ganesan | G01S 5/0072 |
| 2023/0353982 | A1* | 11/2023 | Routt | H04W 4/029 |
| 2024/0205639 | A1* | 6/2024 | Ying | H04W 12/08 |
| 2024/0214976 | A1* | 6/2024 | Zhang | H04L 5/0048 |
| 2024/0430649 | A1* | 12/2024 | Liu | H04W 4/38 |

FOREIGN PATENT DOCUMENTS

| | | | |
|---|---|---|---|
| CN | 112766138 | A | 5/2021 |
| CN | 113114752 | A | 7/2021 |
| EP | 3761679 | A1 | 1/2021 |
| WO | 2019136918 | A1 | 7/2019 |
| WO | 2020093929 | A1 | 5/2020 |

* cited by examiner

SENSING-BASED POSITIONING METHOD AND APPARATUS, AND COMMUNICATION DEVICE

CROSS-REFERENCE TO RELATED APPLICATIONS

This application is a Bypass Continuation Application of PCT International Application No. PCT/CN2022/119275 filed on Sep. 16, 2022, which claims the priority of Chinese Patent Application No. 202111109210.0 filed in China on Sep. 22, 2021, the entire content of which are hereby incorporated by reference.

TECHNICAL FIELD

This application relates to the field of communications technologies, and specifically, to a sensing-based positioning method and apparatus, and a communication device.

BACKGROUND

In addition to a communication capability, a future mobile communication system further has a sensing capability. The sensing capability, that is, one or more devices having the sensing capability can send and receive radio signals to sense information about a target object such as an orientation, a distance, or a speed, or detect, track, recognize, or image a target object, event, or environment. In the future, with deployment of small cells capable of having a high frequency band and a large bandwidth on the order of millimeter waves or terahertzs in a $6^{th}$ generation (6G) network, the resolution of sensing is significantly improved compared with that on the order of centimeter waves, thereby enabling the 6G network to provide a more refined sensing service. However, in related technologies, there is still no related solution about how to perform positioning with reference to the sensing capability.

SUMMARY

Embodiments of this application provide a sensing-based positioning method and apparatus, and a communication device.

A first aspect provides a sensing-based positioning method, including:

receiving, by a first communication device, a positioning requirement; and in a case that the positioning requirement is a positioning requirement associated with a sensing service, sending, by the first communication device, the positioning requirement to a second communication device and sending a sensing requirement to a third communication device.

A second aspect provides a sensing-based positioning method, including:

obtaining, by a third communication device, a sensing requirement, where the sensing requirement is sent by a first communication device in a case that a positioning requirement received by the first communication device is a positioning requirement associated with sensing service management;

obtaining first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement; and sending the first information to at least one of a second communication device and a fourth communication device, where the second communication device includes a terminal and/or a base station associated with the positioning requirement, and the fourth communication device includes a terminal and/or a base station associated with the sensing requirement.

A third aspect provides a sensing-based positioning apparatus, including:

a first receiving module, configured to receive a positioning requirement; and a first sending module, configured to, in a case that the positioning requirement is a positioning requirement associated with a sensing service, send the positioning requirement to a second communication device and send a sensing requirement to a third communication device.

A fourth aspect provides a sensing-based positioning apparatus, including:

a first obtaining module, configured to obtain a sensing requirement, where the sensing requirement is sent by a first communication device in a case that a positioning requirement received by the first communication device is a positioning requirement associated with sensing service management;

a second obtaining module, configured to obtain first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement; and a second sending module, configured to send the first information to at least one of a second communication device and a fourth communication device, where the second communication device includes a terminal and/or a base station associated with the positioning requirement, and the fourth communication device includes a terminal and/or a base station associated with the sensing requirement.

A fifth aspect provides a communication device. The communication device includes a processor, a memory, and a program or an instruction stored on the memory and runnable on the processor, where when being executed by the processor, the program or the instruction implements the steps of the method according to the first aspect or the second aspect.

A sixth aspect provides a communication device, including a processor and a communication interface, where the communication interface is configured to: receive a positioning requirement; and in a case that the positioning requirement is a positioning requirement associated with a sensing service, send the positioning requirement to a second communication device and send a sensing requirement to a third communication device; or the communication interface is configured to obtain a sensing requirement, where the sensing requirement is sent by a first communication device in a case that a positioning requirement received by the first communication device is a positioning requirement associated with sensing service management; the processor is configured to obtain first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement; and the communication interface is configured to send the first information to at least one of a second communication device and a fourth communication device, where the second communication device includes a terminal and/or a base station associated with the positioning requirement, and the fourth communication device includes a terminal and/or a base station associated with the sensing requirement.

A seventh aspect provides a readable storage medium, storing a program or instructions, where the program or the instructions, when being executed by a processor, implement the steps of the method according to the first aspect or implement the steps of the method according to the second aspect.

An eighth aspect provides a chip, including a processor and a communication interface, where the communication interface is coupled to the processor, and the processor is configured to run a program or instructions to implement the method according to the first aspect or implement the method according to the second aspect.

A ninth aspect provides a computer program/program product. The computer program/program product is stored in a non-transient storage medium, and the computer program/program product is executed by at least one processor to implement the steps of the method according to the first aspect or the second aspect.

A tenth aspect provides a communication device, configured to perform the steps of the method according to the first aspect or the second aspect.

DETAILED DESCRIPTION

Figure 1:
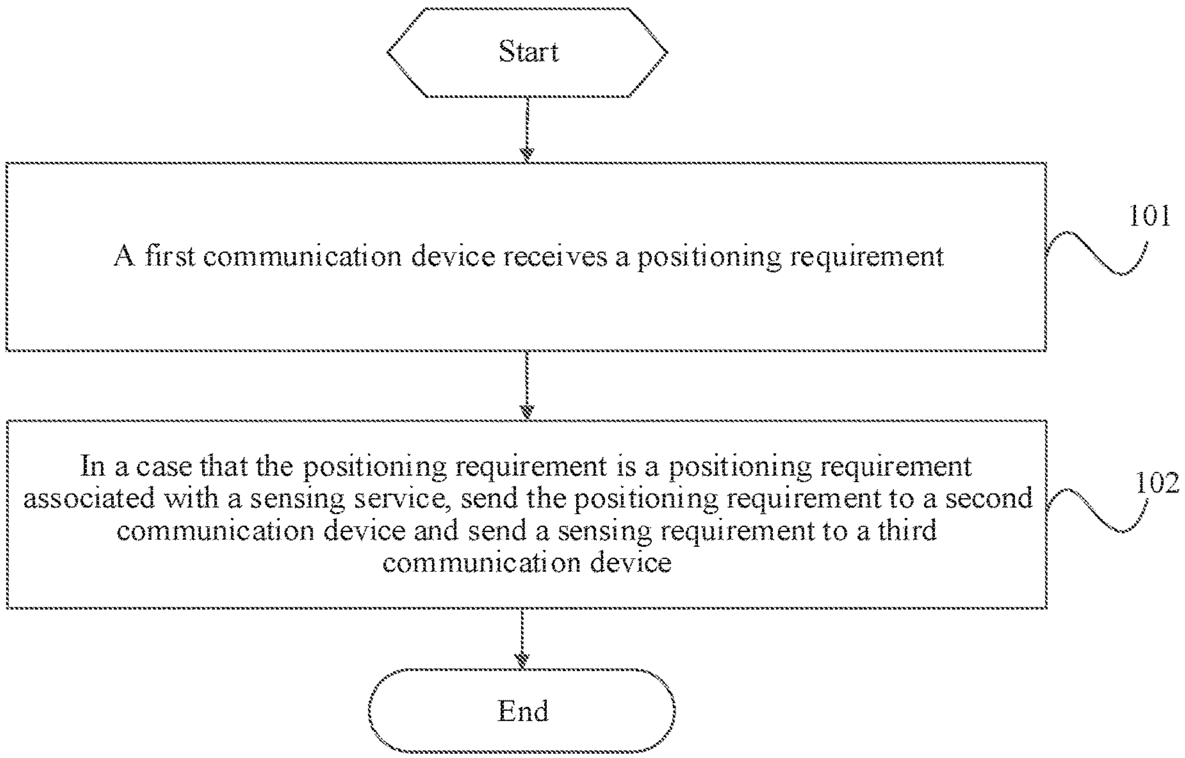
FIG. 1 is a first schematic flowchart of a sensing-based positioning method according to an embodiment of this application.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application fall within the protection scope of this application.

The specification and claims of this application, and terms "first" and "second" are used to distinguish similar objects, but are not used to describe a specific sequence or order. It should be understood that, the terms used in this way is exchangeable in a proper case, so that the embodiments of this application can be implemented in another order different from those shown or described herein. In addition, objects distinguished by "first" and "second" are generally of one type, and the quantity of objects is not limited. For example, there may be one or more first objects. In addition, "and/or" in this specification and the claims represents at least one of the connected objects. The character "/" usually indicates an "or" relationship between associated objects.

It is worth pointing out that, the technologies described in the embodiments of this application are not limited to the Long Term Evolution (LTE)/LTE-Advanced (LTE-A) system, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may be used interchangeably in the embodiments of this application. The described technologies can be applied to the systems and radio technologies mentioned above, and can also be applied to other systems and radio technologies. The new radio (NR) system is described in the following descriptions for the purpose of exemplification, and the NR terms are used in most of the following descriptions. The technologies may also be applied to applications other than NR system applications, such as the $6^{th}$ Generation (6G) communication system.

To enable a person skilled in the art to better understand the embodiments of this application, the following description is first performed.

In addition to a communication capability, a future mobile communication system such as a Beyond $5^{th}$ Generation (B5G) system or 6G system further has a sensing capability. The sensing capability, that is, one or more devices having the sensing capability can send and receive radio signals to sense information about a target object such as an orientation, a distance, or a speed, or detect, track, recognize, or image a target object, event, or environment. In the future, with deployment of small cells capable of having a high frequency band and a large bandwidth on the order of millimeter waves or terahertzs in a 6G network, the resolution of sensing is significantly improved compared with that on the order of centimeter waves, thereby enabling the 6G network to provide a more refined sensing service.

In some sensing applications such as environment reconstruction, when a sensing signal measurement party is a user equipment (UE, also referred to as terminal), collaboration from a positioning function is required, that is, it is necessary to obtain location information of the UE, and an environment map is reconstructed according to the location information of the UE and environment reflection point information that is obtained through measurement; or a base station performs sensing based on a self-transmitting and self-receiving mode and reconstructs a surrounding environment, and then information about the reconstruction is used for assisting in positioning the UE. In other sensing applications such as indoor action recognition, breath detection, and weather detection, a UE is used as a signal sending or receiving party. If location information of the UE is obtained, a sensing signal configuration, or a measurement quantity may be determined according to a location of a transceiver and a to-be-sensed target location or a sensing area, or assistance in calculating a sensing result is provided, thereby obtaining a higher sensing precision and providing a better sensing service. However, in related technologies, there is a problem about how to perform positioning with reference to the sensing capability.

A sensing-based positioning method provided in the embodiments of this application is described in detail below with reference to the accompanying drawings by using some embodiments and application scenarios thereof.

As shown in FIG. 1, an embodiment of this application further provides a sensing-based positioning method, including:

Step 101: A first communication device receives a positioning requirement.

The first communication device may be specifically a location management function (LMF).

In this step, the positioning requirement may be initiated by a third-party application or a core network (or network management system or base station) or a terminal.

For example, the third-party application sends the positioning requirement to an application server (including an intra-network server such as an IP multimedia subsystem (IMS), or an inter-network server); and the application server sends the positioning requirement to the LMF, or the application server sends a sensing requirement to an access and mobility management function (AMF), and the AMF selects at least one LMF and sends the requirement to the LMF.

In another example, the AMF of the core network selects at least one LMF and sends the positioning requirement to the LMF; or the AMF receives the positioning requirement sent by the network management system, selects at least one LMF, and forwards the positioning requirement to the LMF; or the AMF receives the positioning requirement sent by the base station, selects at least one LMF, and forwards the positioning requirement to the LMF;

In still another example, the UE sends the positioning requirement to the AMF of the core network through non-access stratum (NAS) signaling, and the AMF selects at least one LMF and sends the positioning requirement to the LMF.

Step 102: in a case that the positioning requirement is a positioning requirement associated with a sensing service, sending, by the first communication device, the positioning requirement to a second communication device and sending a sensing requirement to a third communication device.

After receiving the positioning requirement, the first communication device determines, according to the positioning requirement, whether sensing service assistance is required; and if sensing service assistance is required for the positioning requirement, determines that the positioning requirement is a positioning requirement associated with the sensing service, triggers a process of combining sensing and positioning, sends the positioning requirement to the second communication device and sends the sensing requirement to the third communication device.

The second communication device may be a first base station and/or a first terminal associated with the positioning requirement, and the third communication device may be a sensing network function or a sensing network element.

Specifically, the sending a sensing requirement to a third communication device includes: sending the sensing requirement to the AMF; and selecting, by the AMF, at least one sensing network function or sensing network element, and sending the sensing requirement to the sensing network function or sensing network element.

The foregoing sensing requirement includes at least one of the following:

a sensing target/object;

a sensing area;

a sensing result/sensing quantity;

sensing quality of service (QoS); and a sensing performance indicator.

The foregoing sensing performance indicator includes at least one of a sensing precision/sensing error, a sensing resolution, a sensing range, a sensing delay, a detection probability, and a false alarm probability.

In the sensing-based positioning method of this embodiment of this application, a positioning requirement is received; and in a case that the positioning requirement is a positioning requirement associated with a sensing service, the positioning requirement is sent to a second communication device and a sensing requirement is sent to a third communication device, thereby triggering a process of combining sensing and positioning, and then performing positioning with reference to a sensing capability.

Optionally, before the sending the positioning requirement to a second communication device, the method further includes:

determining a first base station and a first terminal that are associated with the positioning requirement, where the second communication device includes at least one of the first base station and the first terminal.

Optionally, the sensing requirement contains first indication information, and the first indication information is used for indicating information about the second communication device. For example, the first indication information is identification information of the second communication device.

In this embodiment of this application, after receiving the sensing requirement, the third communication device determines a second base station and/or a second terminal associated with the sensing requirement, and sends the sensing requirement to the second base station and/or the second terminal. The second base station and/or the second terminal may be determined according to the second communication device, or a base station and/or a terminal in a corresponding area may be selected according to an area and a range in the sensing requirement.

Optionally, after the sending the positioning requirement to a second communication device and sending a sensing requirement to a third communication device, the method further includes:

obtaining signal configuration information, where the signal configuration information includes at least one of configuration information for a sensing signal and configuration information for a positioning signal, and the signal configuration information is determined according to at least one of the sensing requirement and the positioning requirement; and sending the configuration information for the positioning signal to the second communication device and/or sending the configuration information for the sensing signal to a fourth communication device, where the fourth communication device includes at least one of a second base station and a second terminal that are associated with the sensing requirement.

Optionally, the signal configuration information is determined by at least one of the first communication device and the third communication device.

In this embodiment of this application, the first communication device may determine the configuration information for the sensing signal and the configuration information for the positioning signal, or the third communication device may determine the configuration information for the sensing signal and the configuration information for the positioning signal, or the first communication device may determine the configuration information for the sensing signal and the second communication device may determine the configuration information for the positioning signal, or the first communication device may determine the configuration information for the positioning signal and the third communication device may determine the configuration information for the sensing signal.

The sensing signal and the positioning signal may be the same reference signal or different reference signals.

In an implementation, the sensing signal and the positioning signal are different reference signals, and the reference signals may be uplink signals, or downlink signals, or one uplink signal and one downlink signal. The sensing network function/sensing network element determines configuration information for the sensing signal according to the sensing requirement, and the LMF determines the configuration information for the positioning signal according to the positioning requirement.

In another implementation, the sensing signal and the positioning signal are the same reference signal, and may be an uplink signal or a downlink signal. In this implementation, a set of signal configuration information is determined, and the signal configuration information includes configuration information for a sensing signal and configuration information for a positioning signal. One party of the first communication device and the third communication device may determine the configuration information for the sensing signal and the configuration information for the positioning signal, and notify the determined signal configuration information to the other party. Alternatively, in this implementation, the configuration information for the sensing signal and the configuration information for the positioning signal may be determined by the first communication device and the third communication device jointly. Specifically, one of the two parties, for example, the LMF may first determine the configuration information for the positioning signal, and send the configuration information for the positioning signal to the sensing network function/sensing network element, and then the sensing network function/sensing network element adds the configuration information for the sensing signal.

Optionally, the configuration information for the positioning signal may alternatively be determined according to the positioning requirement and priori information (existing sensing information, for example, sensing information obtained by triggering the sensing requirement for the last time).

Optionally, in a case that the signal configuration information includes the configuration information for the sensing signal and the configuration information for the positioning signal, the signal configuration information further includes first identification information, where the first identification information is used for indicating that the signal configuration information is used for positioning measurement and sensing measurement.

In a specific embodiment of this application, the sensing signal and the positioning signal are the same reference signal, and the fourth communication device is the same as the second communication device, that is, the same base station or terminal executes sensing measurement and positioning measurement. In this case, it is only necessary for one of the first communication device and the third communication device to send signal configuration information to the second communication device or the fourth communication device. When the configuration information for the sensing signal and the configuration information for the positioning signal use the same configuration, the foregoing first identification information is used for indicating that the signal configuration information is simultaneously used for positioning measurement and sensing measurement. When a measurement result is reported, the AMF knows that the measurement result needs to be sent to the first communication device and the third communication device. Alternatively, if one of the first communication device or the third communication device delivers the signal configuration information or the measurement quantity through the AMF, the AMF knows that the signal configuration information or the measurement quantity is respectively forwarded to a sensing-associated base station/UE and a positioning-associated base station/UE. Optionally, after the sending the positioning requirement to a second communication device and sending a sensing requirement to a third communication device, the method further includes:

obtaining a measurement quantity, where the measurement quantity includes: at least one of a sensing measurement quantity, a positioning measurement quantity, and a common measurement quantity, where the common measurement quantity is used for positioning measurement and sensing measurement; and sending the measurement quantity to at least one of the second communication device and a fourth communication device, where the fourth communication device includes at least one of a second base station and a second terminal that are associated with the sensing requirement.

Optionally, the measurement quantity is determined by at least one of the first communication device and the third communication device.

Specifically, the first communication device may determine the positioning measurement quantity and/or the common measurement quantity, and the third communication device may determine the sensing measurement quantity and the common measurement quantity. The first communication device may autonomously determine the positioning measurement quantity and/or the common measurement quantity, and obtain the sensing measurement quantity and/or the common measurement quantity determined by the third communication device.

Optionally, the measurement quantity includes at least one of the following:

a channel matrix H;

channel state information (CSI), for example, an amplitude and/or a phase of a frequency-domain channel response, or I and Q signal features of a frequency-domain channel response, for example, I and Q signal amplitudes;

a reference signal received power (RSRP);

a receiving signal strength indication (Received Signal Strength Indication, RSSI);

a channel power delay profile (PDP);

a Doppler power spectrum;

Doppler spread;

a coherence bandwidth;

a coherence time;

- a power of each path (including at least a first-arrival path, a line of sight (LOS) path, a first-order reflection path, and a multi-order reflection path) in a multi-path channel;
- a delay of each path in a multi-path channel;
- an angle of each path in a multi-path channel;
- a Doppler frequency shift;
- a quotient or conjugate product of frequency-domain channel responses of a first antenna and a second antenna;
- an amplitude ratio or amplitude difference between received signals of the first antenna and the second antenna;
- a phase difference between the first antenna and the second antenna;
- a delay difference between the first antenna and the second antenna; and
- Angle-related information, for example, an angle of arrival or an angle of departure (including UE-side angle information, base station-side angle information, and reflection point angle information).

In addition, in this embodiment of this application, the configuration information for the signals and the measurement quantity may alternatively be determined by the second communication device and/or the fourth communication device according to the sensing requirement and/or the positioning requirement.

Optionally, the method of this embodiment of this application further includes:

- obtaining a measurement result corresponding to the measurement quantity, where the measurement result is obtained by the second communication device and/or the fourth communication device according to signal configuration information and the measurement quantity, and the signal configuration information includes at least one of configuration information for a sensing signal and configuration information for a positioning signal, and the signal configuration information is determined according to at least one of the sensing requirement and the positioning requirement.

In this embodiment of this application, the fourth communication device executes a sensing measurement process according to the configuration information for the sensing signal, the sensing measurement quantity, and the common measurement quantity. A specific manner of executing the sensing measurement process includes at least one of the following manners: self-transmitting and self-receiving of a base station, sending and receiving between base stations, transmitting of a base station and receiving of a UE, transmitting of a UE and receiving of a base station, self-transmitting and self-receiving of a UE, and sending receiving between UEs.

The second communication device executes a positioning measurement process according to the configuration information for the positioning signal, the positioning measurement quantity, and the common measurement quantity. A specific manner of executing the positioning measurement process includes at least one of the following manners: transmitting of a base station and receiving of a UE, transmitting of a UE and receiving of a base station, self-transmitting and self-receiving of a UE, and sending receiving between UEs. The fourth communication device sends the measurement result to the LMF, and the LMF performs calculation according to the measurement result sent by the fourth communication device to obtain the location information of the UE, and sends the location information to the sensing network function/sensing network element through the AMF.

Optionally, after the obtaining a measurement result corresponding to the measurement quantity, the method further includes:

- obtaining positioning information according to a measurement result that corresponds to a first target measurement quantity and a sensing result that is sent by the third communication device, where the first target measurement quantity includes at least one of the positioning measurement quantity and the common measurement quantity, and the sensing result is sent by the third communication device according to the sensing requirement.

The sensing result sent by the third communication device may be directly fed back by the third communication device according to the sensing requirement. For example, when the sensing requirement is used for requesting to obtain a known sensing result, the third communication device may directly feed back the known sensing result according to the sensing requirement. To be specific, the sensing result includes the known sensing result.

Alternatively, the foregoing sensing result is obtained by the third communication device by measuring the measurement quantity. For example, when the sensing requirement is used for requesting a current sensing result or a sensing result in a future preset time, the third communication device measures the measurement quantity to obtain the sensing result. Based on this, before the obtaining positioning information according to a measurement result that corresponds to a first target measurement quantity and a sensing result that is sent by the third communication device, the method of this embodiment of this application further includes:

- sending a target measurement result corresponding to a second target measurement quantity to the third communication device, where the second target measurement quantity includes at least one of the sensing measurement quantity and the common measurement quantity; and
- obtaining the sensing result determined by the third communication device according to the target measurement result.

In the implementation, the first communication device sends the target measurement result corresponding to the second target measurement quantity to the sensing network function or sensing network element, and the sensing network function or sensing network element obtains the sensing result according to the target measurement result, and sends the sensing result to the first communication device.

Optionally, the sensing result includes first indication information, and the first indication information is used for indicating a correspondence between the sensing result and the first target measurement quantity.

The first indication information may include time information or index information consistent with the first target measurement quantity.

The time information may be an absolute time, a frame number, a transmission time interval (TTI) number, a slot number, a sub-slot number, a symbol number, or the like. Optionally, one sensing result/sensing quantity report may contain a sensing result/sensing quantity of at least one piece of time information.

Optionally, a type of the sensing requirement includes at least one of the following:

a first sensing requirement type, where the first sensing requirement type is used for requesting to obtain a known sensing result;

a second sensing requirement type, where the second sensing requirement type is used for requesting to obtain a current sensing result; and a third sensing requirement type, where the third sensing requirement type is used for requesting to obtain a sensing result in a future preset time.

Optionally, the sensing requirement further includes second indication information, and the second indication information is used for indicating a time corresponding to a sensing result that the sensing requirement requests to obtain.

The time may be at least one of a start time, an end time, a duration, a period, and a quantity of periods. Optionally, this time may be a time point or time window. This time may be one aperiodic time or periodic time. Optionally, this time is an absolute time, for example, represented through universal time chiming (UTC); or a relative time, for example, a time relative to a common time. Optionally, this time is consistent with a time in a sensing request.

Optionally, the sensing requirement may further include an indication of a positioning manner. For example, the positioning manner is a positioning manner based on a time or an angle or the like, or a specific positioning method (for example, a downlink-time difference of arrival (DL-TDOA), a downlink angle of departure (DL-AOD), or a multi-round-trip Time (multi-RTT)), and the third communication device determines, according to the positioning method, a sensing result needing to be fed back.

Optionally, the sensing requirement may further contain a type of sensing feedback, for example, immediate feedback, periodic feedback, or event-triggered feedback. Further, the sensing requirement contains configuration information for the foregoing feedback.

The sensing result in this embodiment of this application may be a measurement value corresponding to a measurement quantity, or may be a result obtained by performing calculation processing on a measurement value corresponding to a measurement quantity.

The sensing result in this embodiment of this application may include at least one of the following:

feature information of a target object, related information of a target event, and related information of a target environment.

The feature information of the target object is understood as information that can reflect an attribute or a state of the target object, and may be at least one of the following: a location of the target object, a speed of the target object, an acceleration of the target object, a material of the target object, a shape of the target object, a category of the target object, a radar cross section (RCS) of the target object, a polarized scattering characteristic, and the like.

The related information of the target event may be understood as information related to the target event, that is, information that can be detected/sensed when the target event occurs, and may be falling detection, intrusion detection, quantity statistics, indoor positioning, gesture recognition, lip-reading recognition, gait recognition, expression recognition, breath monitoring, heart rate monitoring, or the like.

The related information of the target environment may be at least one of the following: humidity, brightness, temperature humidity, atmospheric pressure, air quality, weather conditions, geographic and geomorphic conditions, architecture/vegetation distribution, population statistics, crowd density, vehicle density, and the like.

Figure 2:
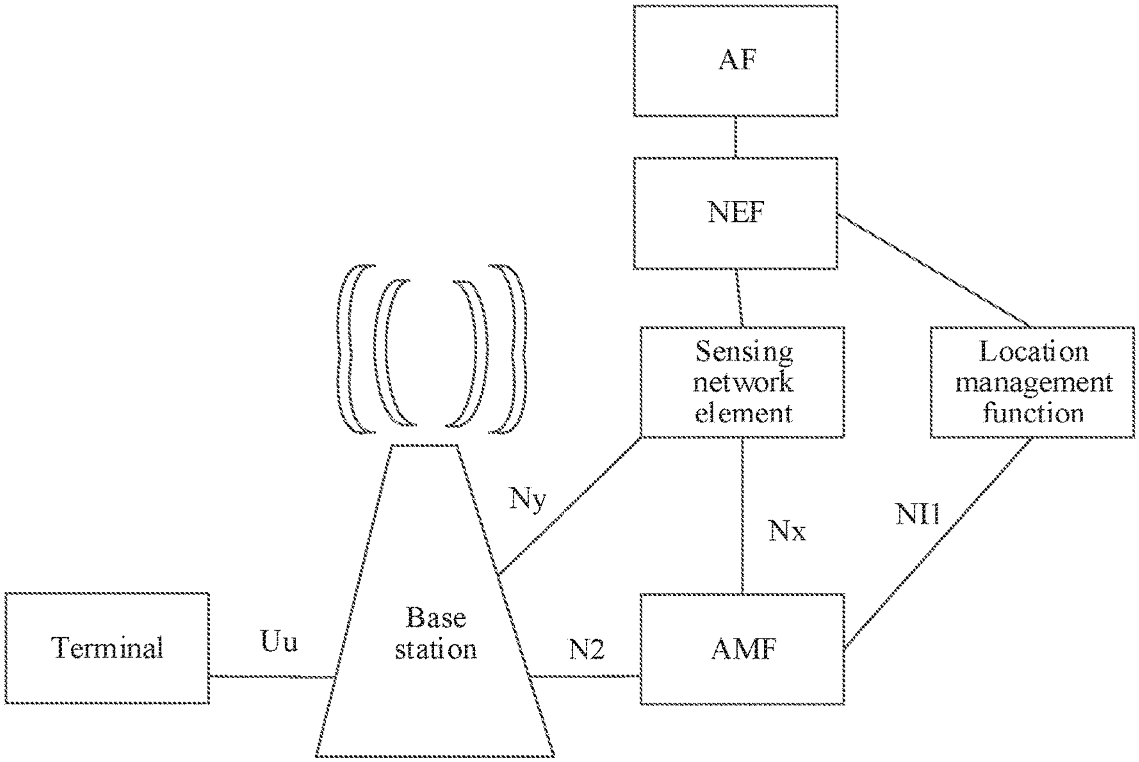
FIG. 2 is a schematic diagram of an architecture of combining sensing and positioning according to an embodiment of this application.

In addition, as shown in FIG. 2, the foregoing interaction between the sensing network function/sensing network element and the base station and/or UE may be performed through the AMF or a newly defined interface, for example, an Nx interface or an Ny interface.

The following describes a sensing-based positioning method of this application with reference to a specific embodiment.

Figure 3:
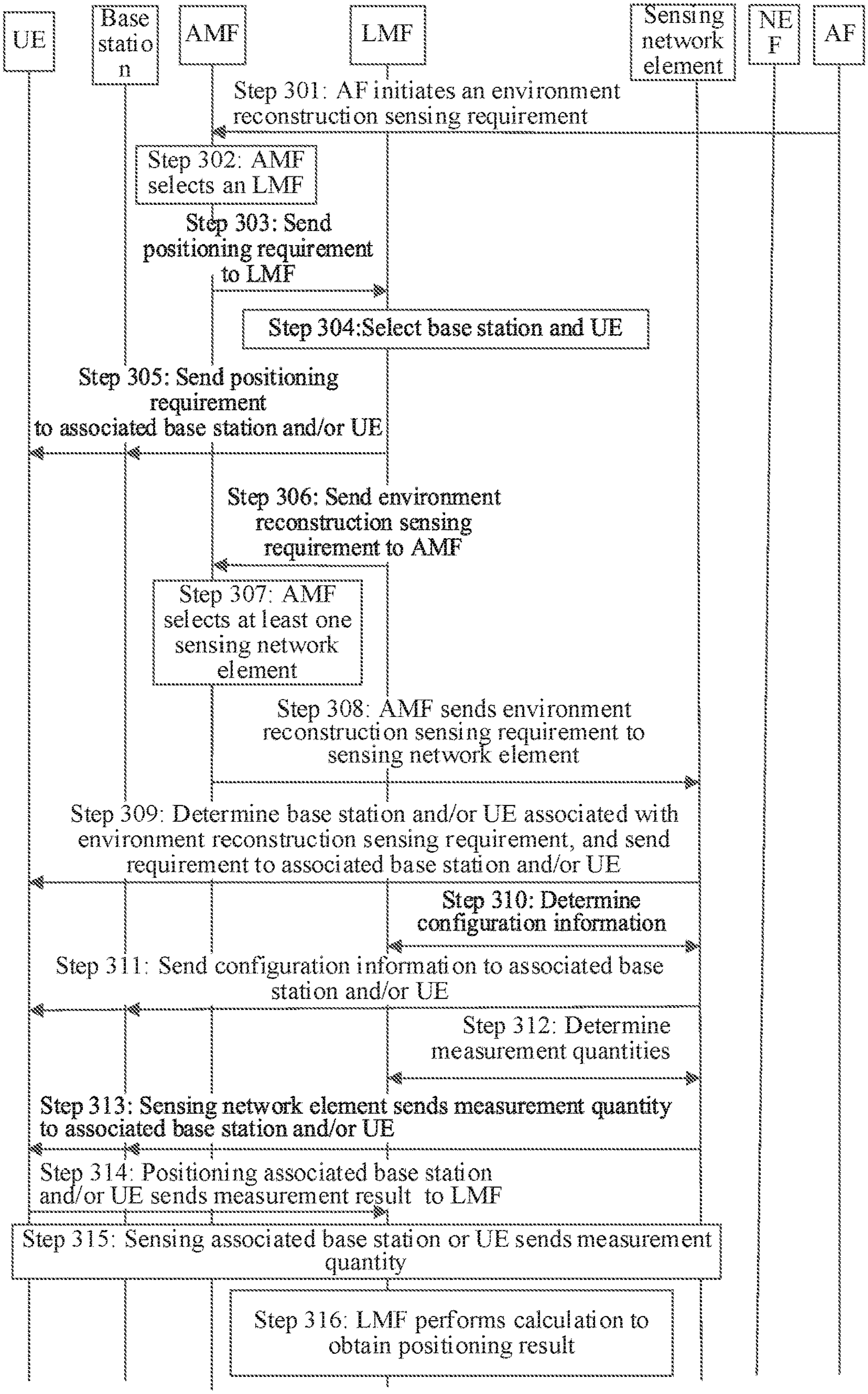
FIG. 3 is a schematic diagram of interaction of a sensing-based positioning method according to an embodiment of this application.

As shown in FIG. 3, the sensing-based positioning method includes:

Step 301: A third-party application (Application Function, AF) initiates a positioning requirement.

Step 302: An AMF selects an LMF.

Step 303: The AMF sends the positioning requirement to the LMF.

Step 304: If the positioning requirement requires environment reconstruction service assistance, select a base station and a UE that are associated with the positioning requirement.

After receiving the positioning requirement, the LMF determines whether the positioning requirement requires environment reconstruction service assistance, that is, whether the positioning requirement is a positioning requirement associated with an environment reconstruction sensing service; and if the positioning requirement is a positioning requirement associated with an environment reconstruction sensing service, for example, information about a surrounding environment is obtained in advance in a single-station positioning mode to assist in positioning, obtains more multi-path information, for example, determines whether a delay path is a line-of-sight path or a reflection path of an obstacle.

The obtaining the environment reconstruction sensing requirement according to the positioning requirement specifically includes determining the environment reconstruction sensing requirement according to a positioning precision/error requirement and an environment reconstruction precision/error requirement, or determining the environment reconstruction sensing requirement according to a positioning delay requirement and an environment reconstruction delay requirement.

The sensing requirement may include a base station and/or a UE associated with the positioning requirement, and is used to assist the sensing network function/sensing network element in selecting a base station and/or a UE associated with the environment reconstruction sensing requirement.

The environment reconstruction sensing requirement includes at least:

an area and a range for environment reconstruction, for example, environment reconstruction in a range of X meters near one or more base stations/UEs;

a precision/error for environment reconstruction, for example, deviations between a size and a location of an obstacle and its actual size and location;

an environment reconstruction resolution, that is, a resolution of a reconstruction map; and an environment reconstruction delay requirement, which may be a maximum allowed delay or allowed delay range.

The feature of the sensing network function or sensing network element includes at least one of the following:

exchanging target information (the target information includes a sensing processing request, an interaction sensing capability, interaction sensing assistance data, or an interaction sensing measurement quantity or sensing result) with a target UE or a service base station of a target UE or a base station associated with a target area, to obtain a target sensing result or sensing measurement quantity (uplink measurement quantity or downlink measurement quantity); and determining a to-be-used sensing method according to factors such as a possible sensing client type, required sensing QoS, a UE sensing capability, and a base station sensing capability, where the sensing method includes: transmitting of a base station A and receiving of a base station B, or base station transmitting UE receiving, or self-transmitting and self-receiving of a base station A, or transmitting of a UE and receiving of a base station, or self-transmitting and self-receiving of a UE, or transmitting of a UE A and receiving of a UE B, or the like;

the sensing network function/sensing network element is located in a core network or on a base station side, where if the sensing network function/sensing network element is located on the base station side, compared with being located in the core network, all processes of a sensing service may be completed (for a case that the base station triggers a sensing service or the UE triggers the sensing service) in a radio access network (RAN);

the sensing network function/sensing network element directly exchanges a sensing request and a sensing result with an application server (for example, an application server of an operator); or the sensing network function/sensing network element exchanges a sensing request and a sensing result with the AMF, and the AMF may exchange a sensing request and a sensing result with an application server (for example, a third-party application server) directly or indirectly (through a gateway mobile location center (GMLC) and a network exposure function (NEF));

managing whole coordination and scheduling of resources required for sensing, for example, sensing resources of a base station and/or a UE;

calculating or verifying a sensing result, and estimating a sensing precision;

supporting an immediate sensing request;

supporting a periodic or event-triggered sensing request; and supporting canceling a periodic or triggered sensing behavior.

A plurality of sensing network functions/sensing network elements may correspond to one AMF. After receiving a sensing requirement, the AMF may select one or more participating sensing network functions/sensing network elements, and factors considered during the selection include at least: requested QoS (for example, a sensing precision, a response time, or a sensing QoS level), an access type (3rd Generation Partnership Project (3GPP) access/non-3GPP access), an access network (AN) type (for example, 5G NR or enhanced Long Term Evolution (eLTE) and a service AN node (for example, next generation Node B (gNB) or next generation enhanced Node B (NG-eNB) of a target UE, RAN configuration information, a capability of a sensing network function/sensing network element, a load of a sensing network function/sensing network element, a location of a sensing network function/sensing network element, an indication of a single event report or a plurality of event reports, an event report duration, network slice information, and the like.

The sensing network function/sensing network element may be one new network element, or an existing network function/network element, for example, an LMF, but a new sensing related function is added.

A network function or network element (for example, a sensing network function/sensing network element) or an application server or another node in the core network completes a supervision process.

Step 305: Send the positioning requirement to the associated base station and/or UE.

Step 306: Send the environment reconstruction sensing requirement to the AMF.

Step 307: The AMF selects at least one sensing network element.

Step 308: The AMF sends the environment reconstruction sensing requirement to the sensing network element.

The environment reconstruction sensing requirement may include a base station and/or a UE associated with the positioning requirement, and is used to assist the sensing network function/sensing network element in selecting a base station and/or a UE associated with the environment reconstruction sensing requirement.

Step 309: The sensing network element determines the base station and/or UE associated with the environment reconstruction sensing requirement, and sends the environment reconstruction sensing requirement to the associated base station and/or UE.

A method for selecting a base station and/or a UE associated with the environment reconstruction sensing requirement may be:

selecting a base station and a UE accessing the base station in a corresponding area according to an area and a range for environment reconstruction in the sensing requirement; and selecting a corresponding base station and UE according to the base station and/or UE associated with the positioning requirement, for example, determining a UE associated with environment reconstruction according to the UE associated with the positioning requirement, and selecting an access base station of the associated UE, and another UE (for example, a UE in a known location) accessing the base station.

Step 310: Determine configuration information for an environment reconstruction sensing signal according to the environment reconstruction sensing requirement, and determine configuration information for a positioning signal according to the positioning requirement.

Optionally, the configuration information for the positioning signal is determined according to the positioning requirement and the environment reconstruction information that is obtained by triggering the environment reconstruction process for the last time.

Optionally, the sensing signal and the positioning signal are different reference signals, and may be uplink signals, or downlink signals, or one uplink signal and one downlink signal. The sensing network function/sensing network element determines a sensing signal configuration according to the environment reconstruction sensing requirement, and the LMF determines a positioning signal configuration according to the positioning requirement.

Optionally, the sensing signal and the positioning signal are the same reference signal, and may be uplink signals, or downlink signals, or one uplink signal and one downlink signal.

One party of the sensing network function/sensing network element and the LMF determines the configuration information for the sensing signal and the configuration information for the positioning signal, and notifies the corresponding signal configuration information to the other party through the AMF.

Alternatively, the configuration information for the sensing signal and the configuration information for the positioning signal is determined by the two parties jointly. A method may be as follows: For a specific signal configuration, for example, if the positioning requirement requires a larger signal bandwidth compared with that for environment reconstruction, the signal bandwidth is determined by the LMF according to the positioning requirement. A specific manner may be as follows: One of the two parties, for example, the LMF first determines a configuration of the positioning signal, and sends the configuration to the sensing network function/sensing network element. The sensing network function/sensing network element adds a configuration of the sensing signal, and then the configuration directly sends to the associated base station and/or UE.

The configuration information for the sensing signal or the positioning signal includes at least one of the following:

a waveform, for example, orthogonal frequency division multiplex (OFDM), Single-carrier Frequency-Division Multiple Access (SC-FDMA), Orthogonal Time Frequency Space (OTFS), Frequency-Modulated Continuous Wave (FMCW), a pulse signal, or the like;

a sub-carrier interval, for example, a sub-carrier interval of an OFDM system is 30 KHz;

a guard interval: a time interval from a moment at the end of sending a signal to a moment at which a latest echo signal of the signal is received; the parameter is directly proportional to a maximum sensing distance, for example, the parameter may be calculated through 2dmax/c, where dmax is the maximum sensing distance (belonging to the sensing requirement), for example, for a sensing signal of self-transmitting and self-receiving, dmax represents a maximum distance from a transmission-reception point of the sensing signal to an emission point of the signal; in some cases, a cyclic prefix (CP) of an OFDM signal may play a role in minimizing the guard interval; and c is the speed of light;

a bandwidth: the parameter is inversely proportional to a distance resolution, and may be obtained through c/2/delta_d, where delta_d is the distance resolution (belonging to the sensing requirement);

a burst duration: the parameter is inversely proportional to a rate resolution (belonging to the sensing requirement), and the parameter is a time span of the sensing signal, and is mainly used for calculating a Doppler frequency shift; and the parameter may be calculated through c/2/delta_v/fc, where delta_v is a speed resolution; and fc is a carrier frequency of the signal or a center frequency point of the signal;

a time-domain interval: the parameter may be calculated through c/2/fc/v_range, where v_range is a maximum rate minus a minimum speed (belonging to the sensing requirement); and the parameter is a time interval between two adjacent sensing signals;

a signal sending power, for example, one value is taken every 2 dBm from −20 dBm to 23 dBm;

a signal format, which is, for example, a demodulation reference signal (DMRS), a channel state information reference signal (CSI-RS), a sounding reference signal (SRS), a tracking reference signal (TRS), a Phase-Tracking Reference Signal (PT-RS), or a positioning reference signal (PRS), or may be a data signal, or a newly defined sensing signal, or a newly defined communication and sensing integration signal, and information such as a related sequence format;

a signal direction, for example, direction or beam information of a sensing signal;

a time resource, for example, a slot index of a sensing signal or a symbol index of a slot, where time resources are divided into two types, where one type is a one-time time resource, for example, one symbol sends one omnidirectional first signal; and the other type is a non-one-time time resource, for example, a plurality of groups periodic time resources or non-consecutive time resources (which may contain a start time and an end time), where each group of periodic time resources send sensing signals in the same direction, and beam directions on different groups of periodic time resources are different;

a frequency resource, including a center frequency point of the sensing signal, a bandwidth, a radio bearer (RB), a sub-carrier, or the like; and a quasi-co-location (QCL) relationship, where the sensing signal includes, for example, a plurality of resources, there is QCL between each resource and one synchronization signal/physical broadcast channel signal block (or synchronization signal block) (Synchronization Signal and PBCH block, SSB), and the QCL includes a Type A, B, C, or D.

Particularly, if the environment reconstruction sensing signal and the positioning signal are not the same reference signal, when the signal time resource configuration is determined, it is necessary to limit a time interval between the environment reconstruction sensing reference signal and the positioning reference signal to be less than a specific range, for example, less than X time units, where the time unit may be a TTI, a slot, a sub-slot, a symbol, or the like, and the time interval is associated with an environment reconstruction delay requirement, a positioning delay requirement, and a UE moving speed.

Step 311: The sensing network function/sensing network element and the LMF respectively send the configuration information for the environment reconstruction sensing signal and the configuration information for the positioning signal to the associated base station and/or UE.

Particularly, if the same reference signal is used for environment reconstruction sensing and positioning, the base station and/or UE for the positioning requirement is the same as the base station and/or UE for the sensing requirement, and the same base station/UE executes measurement processes (a sensing measurement process and a positioning measurement process), only one of the sensing network function/sensing network element and the LMF needs to send the configuration to the UE/base station. When the same configuration is used, the signal configuration information includes identification information, used to identify whether the signal is simultaneously used for positioning and sensing (for example, indicating using a 1-bit information field, where when the information field is "0", it indicates that the signal is not simultaneously used for positioning and sensing, and when the information field is "1", it indicates that the signal is simultaneously used for positioning and sensing).

Step 312: Determine measurement quantities according to the environment reconstruction sensing requirement and the positioning requirement.

The measurement quantities include at least:

a common measurement quantity, that is, a common measurement quantity of the sensing requirement and the positioning requirement, where one party of the sensing network function/sensing network element and the LMF determines the common measurement quantity and notifies corresponding measurement quantity information to the other party through the AMF, or the two parties jointly determine the common measurement quantity; and non-common measurement quantities, that is, respective measurement quantities (a positioning measurement quantity and an environment reconstruction measurement quantity) of the sensing requirement and the positioning requirement, where the sensing network function/sensing network element and the LMF respectively determine the measurement quantities.

The environment reconstruction measurement quantity may be:

a reflection path delay, a delay difference between reflection paths, a distance of a reflection point relative to a UE/base station, an angle of arrival and an angle of departure of a signal relative to a reflection point, an angle of arrival and an angle of departure of a reflection path on a base station side, an angle of arrival and an angle of departure of a reflection path on a UE side, a signal strength of a reflection path, a reflection order identifier (for example, first-order reflection or multi-order reflection) of a reflection path, related information of a local coordinate system of a UE (for example, an orientation of the UE, an antenna panel orientation of the UE, a local coordinate origin, or a local coordinate x/y/z axis direction), coordinates of a reflection point under a reference coordinate system based on a base station, coordinates of a reflection point under a reference coordinate system based on a UE, or coordinates of a reflection point under a global coordinate system (the global coordinate system may be a common reference coordinate system of a plurality of base stations or UEs).

The positioning measurement quantity may be:

a delay of a line-of-sight path, a delay of a reflection path, a delay difference between reflection paths, a delay of a first-arrival path (which may be a line-of-sight path or a reflection path), an angle of arrival and an angle of departure of a signal relative to a reflection point, an angle of arrival and an angle of departure of a multi-path signal on a base station side, an angle of arrival and an angle of departure of a multi-path signal on a UE side, a signal strength of a line-of-sight path, a signal strength of a reflection path, a signal strength of a first-arrival path, a reflection order identifier (for example, first-order reflection or multi-order reflection) of a reflection path, or time points or a difference between time points at which signals from different base stations reach a UE.

The common measurement quantity may be:

a reflection path delay, a delay difference between reflection paths, a distance of a reflection point relative to a UE/base station, an angle of arrival and an angle of departure of a signal relative to a reflection point, an angle of arrival and an angle of departure of a reflection path on a base station side, an angle of arrival and an angle of departure of a reflection path on a UE side, a signal strength of a reflection path, or a reflection order identifier (for example, first-order reflection or multi-order reflection) of a reflection path.

Particularly, the measurement quantities may include only a sensing measurement quantity and a common measurement quantity but include no positioning measurement quantity.

Step 313: The sensing network function/sensing network element sends an environment reconstruction measurement quantity and/or a common measurement quantity to the associated base station and/or UE; and the LMF sends a positioning measurement quantity (if any) and/or a common measurement quantity to the associated base station and/or UE.

Specifically, a manner in which the sensing network function/sensing network element sends an environment reconstruction measurement quantity and/or a common measurement quantity to the associated base station may be:

The environment reconstruction measurement quantity and/or the common measurement quantity is first sent to the AMF, and then sent by the AMF to the base station through an N2 interface; or is directly sent to the base station through a newly defined interface.

A manner in which the sensing network function/sensing network element sends an environment reconstruction measurement quantity and/or a common measurement quantity to the associated UE may be:

The environment reconstruction measurement quantity and/or the common measurement quantity is first sent to the AMF, then sent by the AMF to the base station through an N2 interface, and then sent by the base station to the UE through higher layer signaling or Medium Access Control Control Element (MAC CE) signaling or layer-1 signaling, for example, downlink control information (DCI);

is directly sent to the base station through a newly defined interface, and then sent by the base station to the UE through higher layer signaling or MAC CE signaling or layer-1 signaling (for example, DCI); or is sent to the UE through NAS signaling.

All measurement quantities may alternatively be sent by one of the two parties to the associated base station and/or UE.

In this embodiment of this application, a manner in which the associated base station and/or UE executes the environment reconstruction measurement process according to the environment reconstruction sensing signal configuration, the sensing measurement quantity, and the common measurement quantity includes at least one of the following: self-transmitting and self-receiving of a base station, sending and receiving between base stations, transmitting of a base station and receiving of a UE, transmitting of a UE and receiving of a base station, self-transmitting and self-receiving of a UE, and sending receiving between UEs.

A manner in which the associated base station and/or UE executes the positioning process according to the positioning signal configuration, the positioning measurement quantity, and the common measurement quantity includes at least one of the following: transmitting of a base station and receiving of a UE, transmitting of a UE and receiving of a base station, self-transmitting and self-receiving of a UE, and sending receiving between UEs.

Particularly, if the same reference signal is used for environment reconstruction and positioning, measurement quantities are the same, that is, include only an environment reconstruction measurement quantity and a common measurement quantity but include no positioning measurement quantity, the base station and/or UE associated with the positioning requirement is the same as the base station and/or UE associated with the sensing requirement, and the same base station/UE executes measurement processes (a sensing measurement process and a positioning measurement process), only the environment reconstruction measurement process may be executed, and an environment reconstruction measurement manner includes a positioning measurement manner (that is, a UE participates in measurement), for example, includes at least one of transmitting of a base station and receiving of a UE, transmitting of a UE and receiving of a base station, self-transmitting and self-receiving of a UE, and sending receiving between UEs.

Step 314: The positioning associated base station and/or UE sends a measurement result corresponding to the positioning measurement quantity and/or the common measurement quantity to the LMF.

Step 315: The sensing associated base station or UE sends the environment reconstruction measurement quantity and/or the common measurement quantity to the sensing network function or sensing network element, and the sensing network element performs calculation to obtain environment reconstruction information and sends the environment reconstruction information to the LMF through the AMF.

Alternatively, the LMF sends the common measurement quantity and/or environment reconstruction measurement quantity to the sensing network element through the AMF, and the sensing network element performs calculation to obtain a sensing result (environment reconstruction information) and sends the sensing result to the LMF through the AMF (corresponding to a case that only a positioning measurement quantity and a common measurement quantity are included but no environment reconstruction measurement quantity is included). Particularly, the sensing result include information indicating a correspondence with the positioning measurement quantity and/or common measurement quantity, for example, time information, which may be an absolute time, a frame number, a TTI number, a slot number, a sub-slot number, a symbol number, or the like (the positioning measurement quantity and/or the common measurement quantity contains the same time information), or index information consistent with the positioning measurement quantity and/or the common measurement quantity. For example, the UE is in a location 1, it is learned through measurement that an environment reconstruction measurement quantity is coordinates of a reflection point, and an index number of the coordinates is X. Information about the location 1 of the UE is obtained through a positioning process, and an index of the location information is also X.

Step 316: The LMF performs calculation according to the measurement result and the sensing result to obtain a positioning result.

The measurement result in this step is specifically a measurement result corresponding to the positioning measurement quantity and/or the common measurement quantity.

In the sensing-based positioning method of this embodiment of this application, a positioning requirement is received; and in a case that the positioning requirement is a positioning requirement associated with a sensing service, the positioning requirement is sent to a second communication device and a sensing requirement is sent to a third communication device, thereby triggering a process of combining sensing and positioning, and then performing positioning with reference to a sensing capability.

Figure 4:
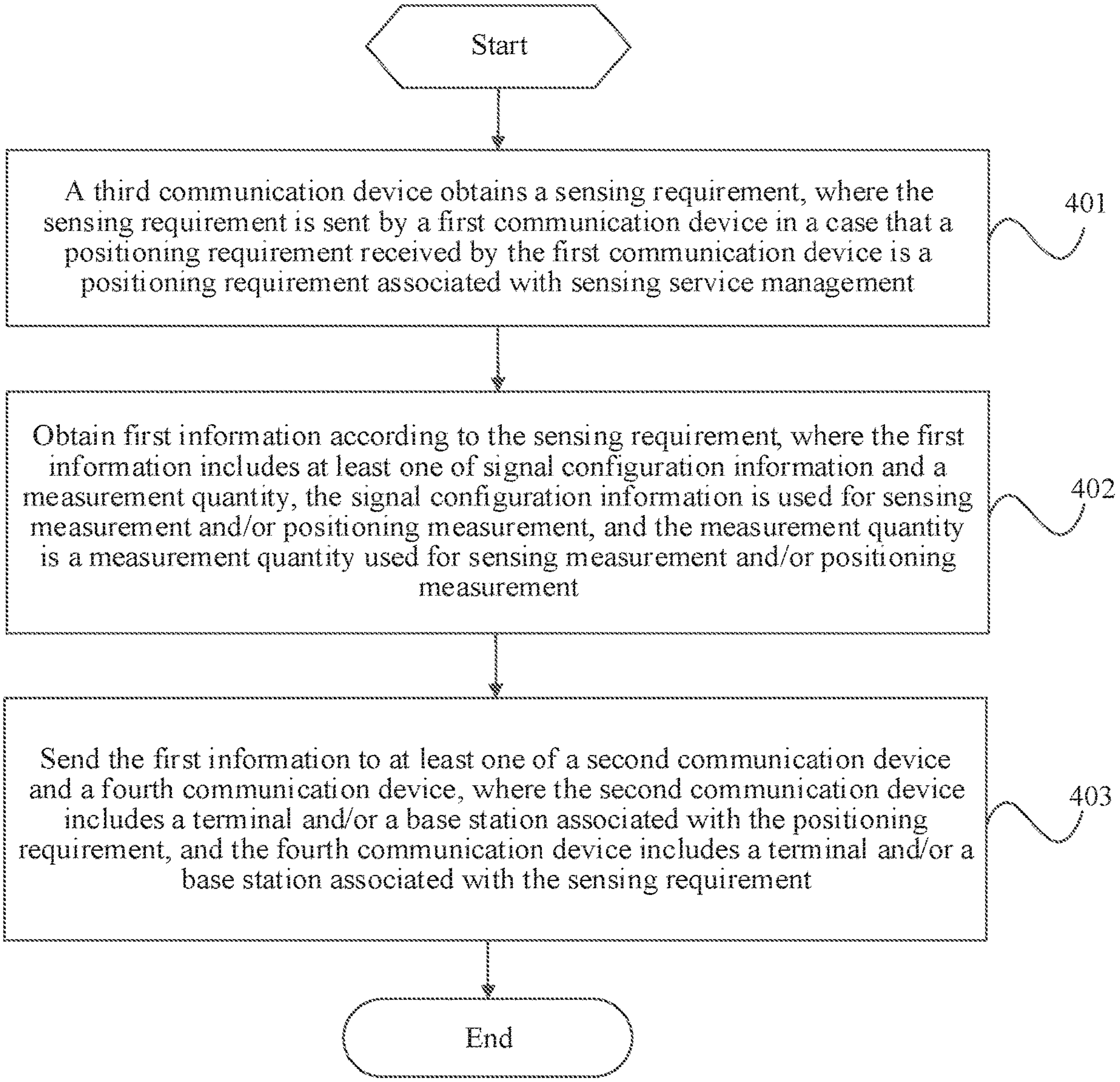
FIG. 4 is a second schematic flowchart of a sensing-based positioning method according to an embodiment of this application.

As shown in FIG. 4, an embodiment of this application further provides a sensing-based positioning method, including:

Step 401: A third communication device obtains a sensing requirement, where the sensing requirement is sent by a first communication device in a case that a positioning requirement received by the first communication device is a positioning requirement associated with sensing service management.

The third communication device may be a sensing network function or a sensing network element.

Step 402: The third communication device obtains first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement.

Step 403: The third communication device sends the first information to at least one of a second communication device and a fourth communication device, where the second communication device includes a terminal and/or a base station associated with the positioning requirement, and the fourth communication device includes a terminal and/or a base station associated with the sensing requirement.

In this embodiment of this application, a third communication device obtains a sensing requirement, where the sensing requirement is sent by a first communication device in a case that a positioning requirement received by the first communication device is a positioning requirement associated with sensing service management; obtains first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement; and sends the first information to at least one of a second communication device and a fourth communication device, where the second communication device includes a terminal and/or a base station associated with the positioning requirement, and the fourth communication device includes a terminal and/or a base station associated with the sensing requirement. In this way, positioning is performed with reference to the sensing information.

Optionally, after the obtaining, by a third communication device, a sensing requirement, the method further includes:

determining the fourth communication device associated with the sensing requirement.

Optionally, the determining the fourth communication device associated with the sensing requirement includes:

determining a communication device located in an area range corresponding to the sensing requirement as the fourth communication device; or determining the fourth communication device according to the second communication device associated with the positioning requirement.

Optionally, the signal configuration information includes at least one of configuration information for a sensing signal and configuration information for a positioning signal.

Optionally, in a case that the signal configuration information includes the configuration information for the sensing signal and the configuration information for the positioning signal, the signal configuration information further includes first identification information, where the first identification information is used for indicating that the signal configuration information is used for positioning measurement and sensing measurement.

Optionally, the signal configuration information is determined by at least one of the first communication device and the third communication device.

Optionally, the measurement quantity includes: at least one of a sensing measurement quantity, a positioning measurement quantity, and a common measurement quantity, where the common measurement quantity is used for positioning measurement and sensing measurement.

Optionally, the measurement quantity is determined by at least one of the first communication device and the third communication device.

Optionally, the method further includes:

determining a sensing result according to the sensing requirement; and sending the sensing result to the first communication device.

Optionally, the determining a sensing result according to the sensing requirement includes:

obtaining a target measurement result that corresponds to a second target measurement quantity and that is sent by a target communication device, where the second target measurement quantity includes at least one of a sensing measurement quantity and a common measurement quantity, and the target communication device includes the first communication device or the fourth communication device; and determining the sensing result according to the target measurement result.

Optionally, a type of the sensing requirement includes at least one of the following:

a first sensing requirement type, where the first sensing requirement type is used for requesting to obtain a known sensing result;

a second sensing requirement type, where the second sensing requirement type is used for requesting to obtain a current sensing result; and a third sensing requirement type, where the third sensing requirement type is used for requesting to obtain a sensing result in a future preset time.

Optionally, the determining a sensing result according to the sensing requirement includes:

determining the sensing result corresponding to the sensing requirement according to the known sensing result in a case that the type of the sensing requirement is the first sensing requirement type.

It should be noted that the sensing-based positioning method performed by the third communication device is a sensing-based positioning method corresponding to the sensing-based positioning method performed by the first communication device, and a specific implementation process is described in the method embodiment of the first communication device. Details are not herein again.

It should be noted that an execution body of the sensing-based positioning method provided in this embodiment of this application may be a sensing-based positioning apparatus, or a control module configured to execute the sensing-based positioning method in the sensing-based positioning apparatus. In the embodiments of this application, a sensing-based positioning apparatus provided in the embodiments of this application is described using an example in which a sensing-based positioning apparatus executes the sensing-based positioning method.

Figure 5:
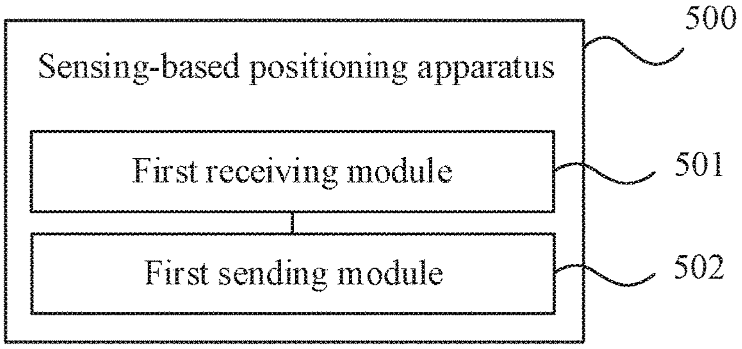
FIG. 5 is a first schematic diagram of modules of a sensing-based positioning apparatus according to an embodiment of this application.

As shown in FIG. 5, an embodiment of this application further provides a sensing-based positioning apparatus 500, including:

a first receiving module 501, configured to receive a positioning requirement; and a first sending module 502, configured to, in a case that the positioning requirement is a positioning requirement associated with a sensing service, send the positioning requirement to a second communication device and send a sensing requirement to a third communication device.

Optionally, the apparatus of this embodiment of this application further includes:

a first determining module, configured to determine, before the first sending module sends the positioning requirement to the second communication device, a first base station and a first terminal that are associated with the positioning requirement, where the second communication device includes at least one of the first base station and the first terminal.

Optionally, the sensing requirement contains first indication information, and the first indication information is used for indicating information about the second communication device.

Optionally, the apparatus of this embodiment of this application further includes:

a third obtaining module, configured to obtain signal configuration information after the first sending module sends the positioning requirement to the second communication device and sends the sensing requirement to the third communication device, where the signal configuration information includes at least one of configuration information for a sensing signal and configuration information for a positioning signal, and the signal configuration information is determined according to at least one of the sensing requirement and the positioning requirement; and a third sending module, configured to send the configuration information for the positioning signal to the second communication device and/or send the configuration information for the sensing signal to a fourth communication device, where the fourth communication device includes at least one of a second base station and a second terminal that are associated with the sensing requirement.

Optionally, the signal configuration information is determined by at least one of the first communication device and the third communication device.

Optionally, in a case that the signal configuration information includes the configuration information for the sensing signal and the configuration information for the positioning signal, the signal configuration information further includes first identification information, where the first identification information is used for indicating that the signal configuration information is used for positioning measurement and sensing measurement.

Optionally, the apparatus of this embodiment of this application further includes:

a fourth obtaining module, configured to obtain a measurement quantity after the first sending module sends the positioning requirement to the second communication device and sends the sensing requirement to the third communication device, where the measurement quantity includes: at least one of a sensing measurement quantity, a positioning measurement quantity, and a common measurement quantity, where the common measurement quantity is used for positioning measurement and sensing measurement; and a fourth sending module, configured to send the measurement quantity to at least one of the second communication device and a fourth communication device, where the fourth communication device includes at least one of a second base station and a second terminal that are associated with the sensing requirement.

Optionally, the measurement quantity is determined by at least one of the first communication device and the third communication device.

Optionally, the apparatus of this embodiment of this application further includes:

a fifth obtaining module, configured to obtain a measurement result corresponding to the measurement quantity, where the measurement result is obtained by the second communication device and/or the fourth communication device according to signal configuration information and the measurement quantity, and the signal configuration information includes at least one of configuration information for a sensing signal and configuration information for a positioning signal, and the signal configuration information is determined according to at least one of the sensing requirement and the positioning requirement.

Optionally, the apparatus of this embodiment of this application further includes:

a second determining module, configured to obtain, after the fifth obtaining module obtains the measurement result corresponding to the measurement quantity, positioning information according to a measurement result that corresponds to a first target measurement quantity and a sensing result that is sent by the third communication device, where the first target measurement quantity includes at least one of the positioning measurement quantity and the common measurement quantity, and the sensing result is sent by the third communication device according to the sensing requirement.

Optionally, the apparatus of this embodiment of this application further includes:

a fifth sending module, configured to send, before the second determining module obtains the positioning information according to the measurement result that corresponds to the first target measurement quantity and the sensing result that is sent by the third communication device, a target measurement result corresponding to a second target measurement quantity to the third communication device, where the second target measurement quantity includes at least one of the sensing measurement quantity and the common measurement quantity; and a sixth obtaining module, configured to obtain the sensing result determined by the third communication device according to the target measurement result.

Optionally, the sensing result includes first indication information, and the first indication information is used for indicating a correspondence between the sensing result and the first target measurement quantity.

Optionally, a type of the sensing requirement includes at least one of the following:

a first sensing requirement type, where the first sensing requirement type is used for requesting to obtain a known sensing result;

a second sensing requirement type, where the second sensing requirement type is used for requesting to obtain a current sensing result; and a third sensing requirement type, where the third sensing requirement type is used for requesting to obtain a sensing result in a future preset time.

Optionally, the sensing requirement further includes second indication information, and the second indication information is used for indicating a time corresponding to a sensing result that the sensing requirement requests to obtain.

Based on the apparatus of this embodiment of this application, a positioning requirement is received; and in a case that the positioning requirement is a positioning requirement associated with a sensing service, the positioning requirement is sent to a second communication device and a sensing requirement is sent to a third communication device, thereby triggering a process of combining sensing and positioning, and then performing positioning with reference to a sensing capability.

Figure 6:
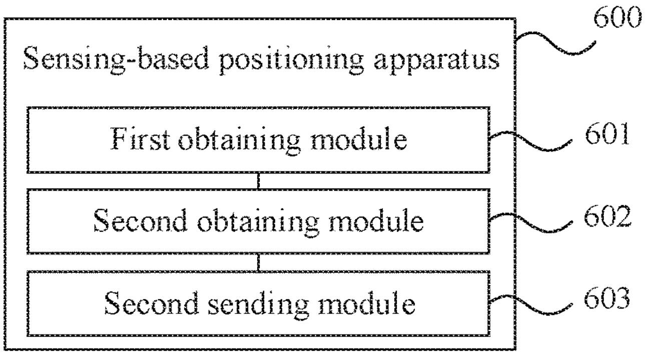
FIG. 6 is a second schematic diagram of modules of a sensing-based positioning apparatus according to an embodiment of this application.

As shown in FIG. 6, an embodiment of this application further provides a sensing-based positioning apparatus 600, including:

a first obtaining module 601, configured to obtain a sensing requirement, where the sensing requirement is sent by a first communication device in a case that a positioning requirement received by the first communication device is a positioning requirement associated with sensing service management;

a second obtaining module 602, configured to obtain first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement; and a second sending module 603, configured to send the first information to at least one of a second communication device and a fourth communication device, where the second communication device includes a terminal and/or a base station associated with the positioning requirement, and the fourth communication device includes a terminal and/or a base station associated with the sensing requirement.

Optionally, the apparatus of this embodiment of this application further includes:

a third determining module, configured to determine the fourth communication device associated with the sensing requirement after the first obtaining module obtains the sensing requirement.

Optionally, based on the apparatus of this embodiment of this application, the third determining module is configured to determine a communication device located in an area range corresponding to the sensing requirement as the fourth communication device; or determine the fourth communication device according to the second communication device associated with the positioning requirement.

Optionally, based on the apparatus of this embodiment of this application, the signal configuration information includes at least one of configuration information for a sensing signal and configuration information for a positioning signal.

Optionally, based on the apparatus of this embodiment of this application, in a case that the signal configuration information includes the configuration information for the sensing signal and the configuration information for the positioning signal, the signal configuration information further includes first identification information, where the first identification information is used for indicating that the signal configuration information is used for positioning measurement and sensing measurement.

Optionally, based on the apparatus of this embodiment of this application, the signal configuration information is determined by at least one of the first communication device and the third communication device.

Optionally, the measurement quantity includes: at least one of a sensing measurement quantity, a positioning measurement quantity, and a common measurement quantity, where the common measurement quantity is used for positioning measurement and sensing measurement.

Optionally, based on the apparatus of this embodiment of this application, the measurement quantity is determined by at least one of the first communication device and the third communication device.

Optionally, the apparatus of this embodiment of this application further includes:

a fourth determining module, configured to determine a sensing result according to the sensing requirement; and a sixth sending module, configured to send the sensing result to the first communication device.

Optionally, based on the apparatus of this embodiment of this application, the fourth determining module includes:

a first obtaining sub-module, configured to obtain a target measurement result that corresponds to a second target measurement quantity and that is sent by a target communication device, where the second target measurement quantity includes at least one of a sensing measurement quantity and a common measurement quantity, and the target communication device includes the first communication device or the fourth communication device; and a first determining sub-module, configured to determine the sensing result according to the target measurement result.

Optionally, based on the apparatus of this embodiment of this application, a type of the sensing requirement includes at least one of the following:

a first sensing requirement type, where the first sensing requirement type is used for requesting to obtain a known sensing result;

a second sensing requirement type, where the second sensing requirement type is used for requesting to obtain a current sensing result; and a third sensing requirement type, where the third sensing requirement type is used for requesting to obtain a sensing result in a future preset time.

Optionally, based on the apparatus of this embodiment of this application, the fourth determining module is configured to determine the sensing result corresponding to the sensing requirement according to the known sensing result in a case that the type of the sensing requirement is the first sensing requirement type.

Figure 7:
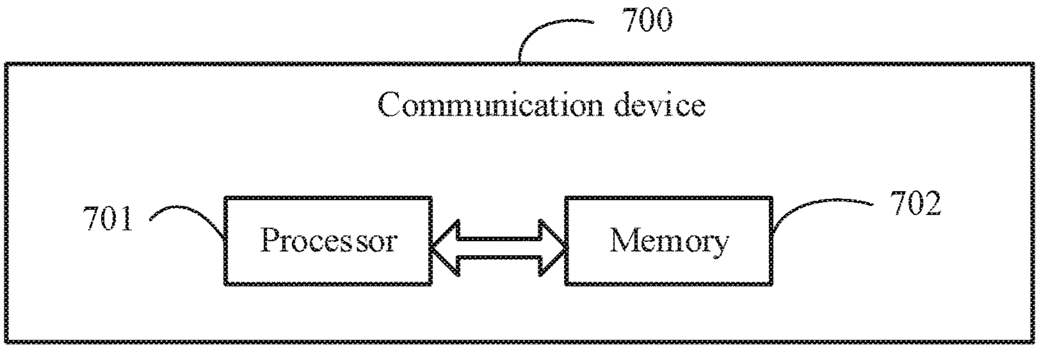
FIG. 7 is a structural block diagram of a communication device according to an embodiment of this application.

Optionally, as shown in FIG. 7, an embodiment of this application further provides a communication device 700, including a processor 701, a memory 702, and a program or an instruction stored on the memory 702 and executable on the processor 701, where when executed by the processor 701, the program or instruction implements the processes of the foregoing sensing-based positioning method embodiment, and can achieve the same technical effects. To avoid repetition, details are not described herein again.

An embodiment of this application further provides a communication device, the communication device may be specifically the foregoing first communication device or third communication device, and the communication device includes a processor and a communication interface. When the communication device is the foregoing first communication device, the communication interface is configured to: receive a positioning requirement; and in a case that the positioning requirement is a positioning requirement associated with a sensing service, send the positioning requirement to a second communication device and send a sensing requirement to a third communication device.

When the communication device is the foregoing third communication device, the communication interface is configured to obtain a sensing requirement, where the sensing requirement is sent by a first communication device in a case that a positioning requirement received by the first communication device is a positioning requirement associated with sensing service management; the processor is configured to obtain first information according to the sensing requirement, where the first information includes at least one of signal configuration information and a measurement quantity, the signal configuration information is used for sensing measurement and/or positioning measurement, and the measurement quantity is a measurement quantity used for sensing measurement and/or positioning measurement; and the communication interface is configured to send the first information to at least one of a second communication device and a fourth communication device, where the second communication device includes a terminal and/or a base station associated with the positioning requirement, and the fourth communication device includes a terminal and/or a base station associated with the sensing requirement.

The communication device embodiment corresponds to the foregoing method embodiment, and each implementation process and implementation of the foregoing communication device method embodiment is applicable to the communication device embodiment, and can achieve the same technical effect.

Figure 8:
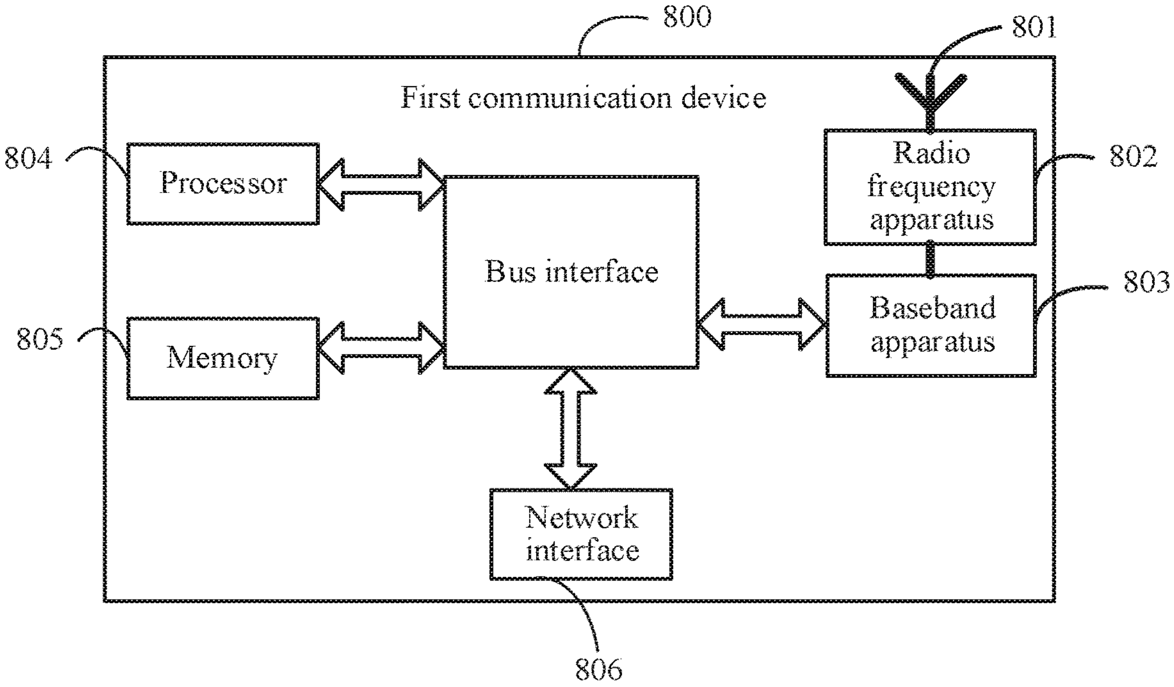
FIG. 8 is a structural block diagram of a first communication device according to an embodiment of this application.

Specifically, an embodiment of this application further provides a communication device. Optionally, the communication device is the foregoing first communication device. As shown in FIG. 8, the communication device 800 includes: an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information to be sent, and sends the information to the radio frequency apparatus 802. The radio frequency apparatus 802 processes the received information and sends the information by using the antenna 801.

A frequency band processing apparatus may be located in the baseband apparatus 803. The method performed by the network-side device in the foregoing embodiments may be implemented in the baseband apparatus 803. The baseband apparatus 803 includes a processor 804 and a memory 805.

The baseband apparatus 803 may include, for example, at least one baseband plate. A plurality of chips are disposed on the baseband plate. As shown in FIG. 8, one of the plurality of chips is, for example, the processor 804, and is connected to the memory 805, to invoke a program in the memory 805 to perform operations of the first communication device in the foregoing method embodiments.

The baseband apparatus 803 may further include a network interface 806, configured to exchange information with the radio frequency apparatus 802. The interface is, for example, a common public radio interface (CPRI).

Specifically, the communication device (the first communication device) of this embodiment of this application further includes: an instruction or a program stored on the memory 805 and runnable on the processor 804. The processor 804 invokes the instruction or program in the memory 805 to perform the method performed by the modules shown in FIG. 5, and achieve the same technical effect. To avoid repetition, details are not described herein again.

Figure 9:
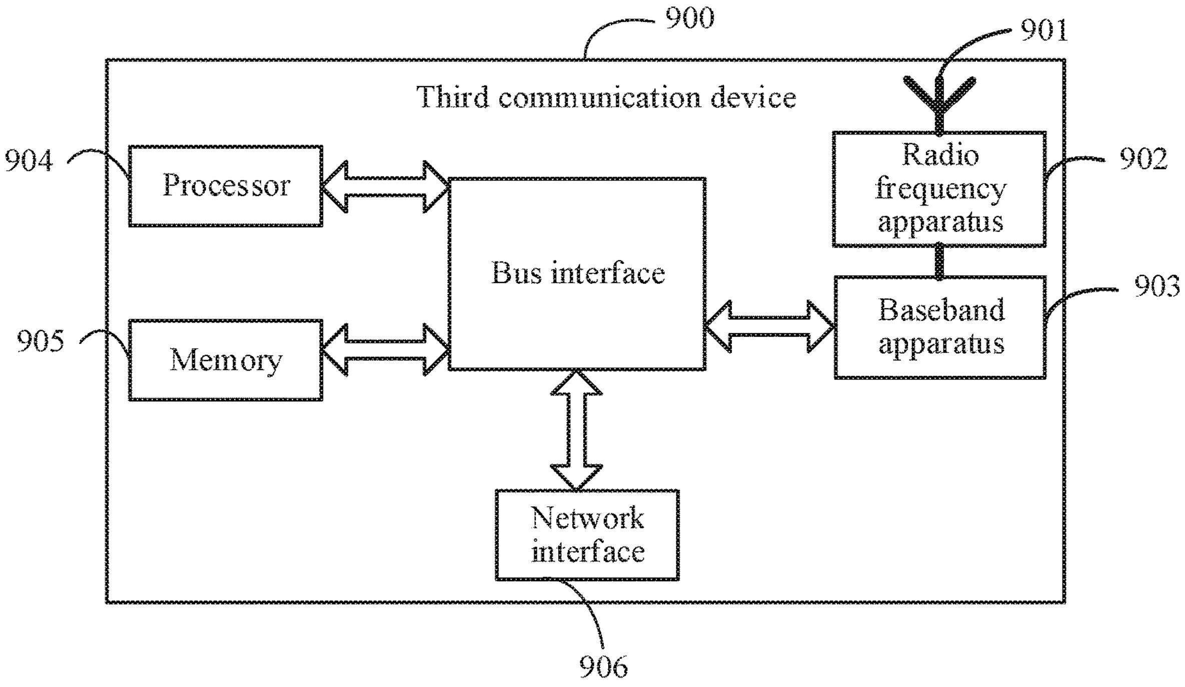
FIG. 9 is a structural block diagram of a third communication device according to an embodiment of this application.

An embodiment of this application further provides a communication device. The communication device may be specifically the foregoing third communication device. As shown in FIG. 9, the network-side device includes a baseband apparatus 903. The baseband apparatus 903 processes to-be-sent information.

A frequency band processing apparatus may be located in the baseband apparatus 903. The method performed by the network-side device in the foregoing embodiments may be implemented in the baseband apparatus 903. The baseband apparatus 903 includes a processor 904 and a memory 905.

The baseband apparatus 903 may include, for example, at least one baseband plate. A plurality of chips are disposed on the baseband plate. As shown in FIG. 9, one of the plurality of chips is, for example, the processor 904, and is connected to the memory 905, to invoke a program in the memory 905 to perform operations of the third communication device in the foregoing method embodiments.

The baseband apparatus 903 may further include a network interface 906, configured to exchange information with the radio frequency apparatus 902. The interface is, for example, a common public radio interface (CPRI).

Specifically, the communication device (the third communication device) of this embodiment of this application further includes: an instruction or a program stored on the memory 905 and runnable on the processor 904. The processor 904 invokes the instruction or program in the memory 905 to perform the method performed by the modules shown in FIG. 6, and achieve the same technical effect. To avoid repetition, details are not described herein again.

An embodiment of this application further provides a readable storage medium. The readable storage medium stores a program or instructions, and when executed by a processor, the program or instructions implement the processes of the foregoing sensing-based positioning method embodiment, and can achieve the same technical effects. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, an optical disc, or the like.

An embodiment of this application further provides a chip. The chip includes a processor and a communication interface. The communication interface is coupled to the processor. The processor is configured to run a program or instructions to implement all embodiments of the sensing-based positioning method described above, and the same technical effects can be achieved, which will not be described in detail herein again to avoid repetition.

It should be noted that, the chip mentioned in the embodiments of this application may also be referred to as a system-level chip, a system chip, a chip system, a system on chip, or the like.

An embodiment of this application further provides a computer program/program product. The computer program/program product is stored in a non-transient storage medium, and the computer program/program product is executed by at least one processor to implement the processes of the foregoing sensing-based positioning method embodiment, and can achieve the same technical effects. To avoid repetition, details are not described herein again.

It should be noted that the terms “include”, “comprise”, or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence “including one” does not exclude that there are still other same elements in the processes, methods, objects, or apparatuses. In addition, it should be noted that the range of the method and apparatus in the implementations of this application is not limited to performing functions in the shown or discussed order, and may further include performing functions in a basically simultaneous manner or in reverse order according to the involved functions. For example, the described method may be performed in an order different from the described order, and steps may be further added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may alternatively be implemented by hardware, but in many cases, the former manner is a better implementation. Based on such an understanding, the technical solutions of this application essentially or the part contributing to the related technology may be implemented in a form of a computer software product. The computer software product is stored in a storage medium (such as a ROM/RAM, a magnetic disk, or an optical disc) and includes several instructions for instructing a terminal (which may be a mobile phone, a computer, a server, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A sensing-based positioning method, comprising:

receiving, by a first communication device, a positioning requirement; and in response to determining that the positioning requirement is a positioning requirement associated with a sensing service, sending, by the first communication device, the positioning requirement to a second communication device and sending a sensing requirement to a third communication device, wherein after the sending the positioning requirement to a second communication device and sending a sensing requirement to a third communication device, the method further comprises:

obtaining signal configuration information, wherein the signal configuration information comprises at least one of configuration information for a sensing signal or configuration information for a positioning signal, wherein in response to determining that the signal configuration information comprises the configuration information for the sensing signal and the configuration information for the positioning signal, the signal configuration information further comprises first identification information, wherein the first identification information is used for indicating that the signal configuration information is used for positioning measurement and sensing measurement, wherein the signal configuration information is determined by at least one of the first communication device or the third communication device, or wherein after the sending the positioning requirement to a second communication device and sending a sensing requirement to a third communication device, the method further comprises:

obtaining a measurement quantity, wherein the measurement quantity comprises: at least one of a sensing measurement quantity, a positioning measurement quantity, or a common measurement quantity, wherein the common measurement quantity is used for positioning measurement and sensing measurement, wherein the measurement quantity is determined by at least one of the first communication device or the third communication device.

2. The method according to claim 1, wherein before the sending the positioning requirement to a second communication device, the method further comprises:

determining a first base station and a first terminal that are associated with the positioning requirement, wherein the second communication device comprises at least one of the first base station or the first terminal; or, wherein the sensing requirement contains first indication information, and the first indication information is used for indicating information about the second communication device.

3. The method according to claim 1, wherein after the sending the positioning requirement to a second communication device and sending a sensing requirement to a third communication device, the method further comprises:

sending the configuration information for the positioning signal to the second communication device and/or sending the configuration information for the sensing signal to a fourth communication device, wherein the fourth communication device comprises at least one of a second base station or a second terminal that are associated with the sensing requirement.

4. The method according to claim 1, wherein after the sending the positioning requirement to a second communication device and sending a sensing requirement to a third communication device, the method further comprises:

sending the measurement quantity to at least one of the second communication device or a fourth communication device, wherein the fourth communication device comprises at least one of a second base station or a second terminal that are associated with the sensing requirement.

5. The method according to claim 4, further comprising:

obtaining a measurement result corresponding to the measurement quantity, wherein the measurement result is obtained by the second communication device and/or the fourth communication device according to signal configuration information and the measurement quantity, and the signal configuration information comprises at least one of configuration information for a sensing signal or configuration information for a positioning signal, and the signal configuration information is determined according to at least one of the sensing requirement or the positioning requirement;

wherein after the obtaining a measurement result corresponding to the measurement quantity, the method further comprises:

obtaining positioning information according to a measurement result that corresponds to a first target measurement quantity and a sensing result that is sent by the third communication device, wherein the first target measurement quantity comprises at least one of the positioning measurement quantity or the common measurement quantity, and the sensing result is sent by the third communication device according to the sensing requirement.

6. The method according to claim 5, wherein before the obtaining positioning information according to a measurement result that corresponds to a first target measurement quantity and a sensing result that is sent by the third communication device, the method further comprises:

sending a target measurement result corresponding to a second target measurement quantity to the third communication device, wherein the second target measurement quantity comprises at least one of the sensing measurement quantity or the common measurement quantity; and obtaining the sensing result determined by the third communication device according to the target measurement result; or, wherein the sensing result comprises indication information used for indicating a correspondence between the sensing result and the first target measurement quantity; or, wherein the sensing result comprises a known sensing result.

7. The method according to claim 1, wherein a type of the sensing requirement comprises at least one of the following:

a first sensing requirement type, wherein the first sensing requirement type is used for requesting to obtain a known sensing result;

a second sensing requirement type, wherein the second sensing requirement type is used for requesting to obtain a current sensing result; or a third sensing requirement type, wherein the third sensing requirement type is used for requesting to obtain a sensing result in a future preset time;

wherein the sensing requirement further comprises second indication information, and the second indication information is used for indicating a time corresponding to a sensing result that the sensing requirement requests to obtain.

8. A non-transitory readable storage medium, storing a program or instructions, wherein the program or the instructions, when being executed by a processor, implement the steps of the sensing-based positioning method according to claim 1.

9. A sensing-based positioning method, comprising:

obtaining, by a third communication device, a sensing requirement, wherein the sensing requirement is sent by a first communication device in response to determining that a positioning requirement received by the first communication device is a positioning requirement associated with sensing service;

obtaining first information according to the sensing requirement, wherein the first information comprises at least one of signal configuration information or a measurement quantity, the signal configuration information is used for sensing measurement and/or positioning measurement, and the measurement quantity is a measurement quantity used for sensing measurement and/or positioning measurement; and sending the first information to at least one of a second communication device or a fourth communication device, wherein the second communication device comprises a terminal and/or a base station associated with the positioning requirement, and the fourth communication device comprises a terminal and/or a base station associated with the sensing requirement, wherein the signal configuration information comprises at least one of configuration information for a sensing signal or configuration information for a positioning signal;

wherein in response to determining that the signal configuration information comprises the configuration information for the sensing signal and the configuration information for the positioning signal, the signal configuration information further comprises first identification information, wherein the first identification information is used for indicating that the signal configuration information is used for positioning measurement and sensing measurement;

wherein the signal configuration information is determined by at least one of the first communication device or the third communication device, wherein the measurement quantity comprises: at least one of a sensing measurement quantity, a positioning measurement quantity, or a common measurement quantity, wherein the common measurement quantity is used for positioning measurement and sensing measurement;

wherein the measurement quantity is determined by at least one of the first communication device or the third communication device.

10. The method according to claim 9, wherein after the obtaining, by a third communication device, a sensing requirement, the method further comprises:

determining the fourth communication device associated with the sensing requirement;

wherein the determining the fourth communication device associated with the sensing requirement comprises:

determining a communication device located in an area range corresponding to the sensing requirement as the fourth communication device; or determining the fourth communication device according to the second communication device associated with the positioning requirement.

11. The method according to claim 9, further comprising:

determining a sensing result according to the sensing requirement; and sending the sensing result to the first communication device.

12. The method according to claim 11, wherein the determining a sensing result according to the sensing requirement comprises:

obtaining a target measurement result that corresponds to a second target measurement quantity and that is sent by a target communication device, wherein the second target measurement quantity comprises at least one of a sensing measurement quantity or a common measurement quantity, and the target communication device comprises the first communication device or the fourth communication device; and determining the sensing result according to the target measurement result.

13. The method according to claim 11, wherein a type of the sensing requirement comprises at least one of the following:

a first sensing requirement type, wherein the first sensing requirement type is used for requesting to obtain a known sensing result;

a second sensing requirement type, wherein the second sensing requirement type is used for requesting to obtain a current sensing result; or a third sensing requirement type, wherein the third sensing requirement type is used for requesting to obtain a sensing result in a future preset time;

wherein the determining a sensing result according to the sensing requirement comprises:

determining the sensing result corresponding to the sensing requirement according to the known sensing result in response to determining that the type of the sensing requirement is the first sensing requirement type.

14. A communication device, comprising a processor, a memory, and a program or an instruction stored on the memory and runnable on the processor, wherein when being executed by the processor, the program or the instruction implements the steps of the sensing-based positioning method according to claim 9.

15. A non-transitory readable storage medium, storing a program or instructions, wherein the program or the instructions, when being executed by a processor, implement the steps of the sensing-based positioning method according to claim 9.

16. A communication device, comprising a processor, a memory, and a program or an instruction stored on the memory and runnable on the processor, wherein the program or instruction, when executed by the processor, causes the communication device to perform:

receiving a positioning requirement; and in response to determining that the positioning requirement is a positioning requirement associated with a sensing service, sending the positioning requirement to a second communication device and sending a sensing requirement to a third communication device, wherein after the sending the positioning requirement to a second communication device and sending a sensing requirement to a third communication device, the communication device is further configured to perform:

obtaining signal configuration information, wherein the signal configuration information comprises at least one of configuration information for a sensing signal or configuration information for a positioning signal, wherein in response to determining that the signal configuration information comprises the configuration information for the sensing signal and the configuration information for the positioning signal, the signal configuration information further comprises first identification information, wherein the first identification information is used for indicating that the signal configuration information is used for positioning measurement and sensing measurement, wherein the signal configuration information is determined by at least one of the first communication device or the third communication device, or wherein after the sending the positioning requirement to a second communication device and sending a sensing requirement to a third communication device, the communication device is further configured to perform:

obtaining a measurement quantity, wherein the measurement quantity comprises: at least one of a sensing measurement quantity, a positioning measurement quantity, or a common measurement quantity, wherein the common measurement quantity is used for positioning measurement and sensing measurement, wherein the measurement quantity is determined by at least one of the first communication device or the third communication device.

* * * * *